W. S. SCHUYLER.
RUNNING BOARD SUPPORT FOR USE ON AUTOMOBILES.
APPLICATION FILED MAY 27, 1916.

1,215,721.   Patented Feb. 13, 1917.

WITNESSES:

INVENTOR.
Wilton Sumner Schuyler
BY
George W. Hinton
ATTORNEY.

UNITED STATES PATENT OFFICE.

WILTON SUMNER SCHUYLER, OF SAVANNAH, MISSOURI.

RUNNING-BOARD SUPPORT FOR USE ON AUTOMOBILES.

1,215,721.  Specification of Letters Patent.  Patented Feb. 13, 1917.

Application filed May 27, 1916. Serial No. 100,290.

*To all whom it may concern:*

Be it known that I, WILTON SUMNER SCHUYLER, a citizen of the United States, residing at Savannah, in the county of Andrew and State of Missouri, have invented certain new and useful Improvements in Running-Board Supports for Use on Automobiles, of which the following is a specification, reference being had therein to the accompanying drawing.

My invention relates to improvements in that class of supports, which are used for supporting the running board of automobiles, and the objects of my improvements are, first; to provide a simple, substantial, durable and efficient support of this class, which can readily be attached to the ordinary automobile, now generally in use, without drilling holes in, or otherwise mutilating any of the parts of said automobile, second; to so construct a support of this class and adjusting means therefor, that said support acts as a tie bar, for tying the longitudinal rails of an automobile and its running boards together, under strain, thereby holding said boards and their connected parts, against vibration and consequent rattling, third; to so construct said support that it shall be cheap in cost of manufacture, extremely strong and light of weight.

I attain these objects by the devices illustrated in the accompanying drawings, in which:—

Figure 1:
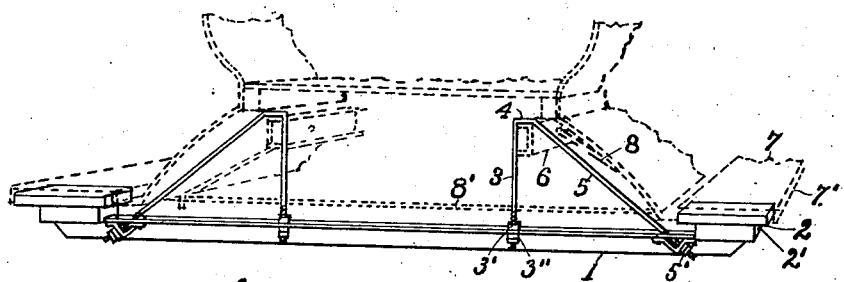

Figure 1 is a perspective view of the support, with certain parts of an automobile indicated by dotted lines.

Figure 2:
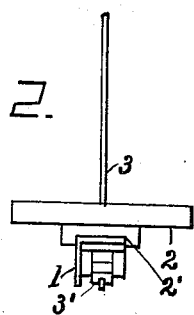
Figure 3:
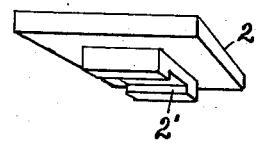
Figure 4:
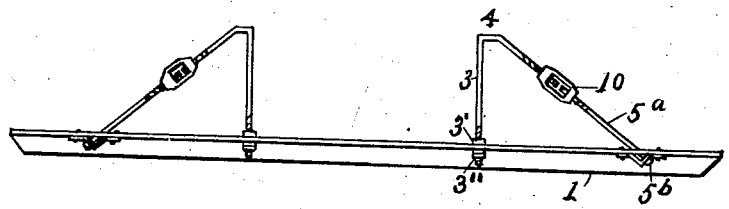
Figure 5:
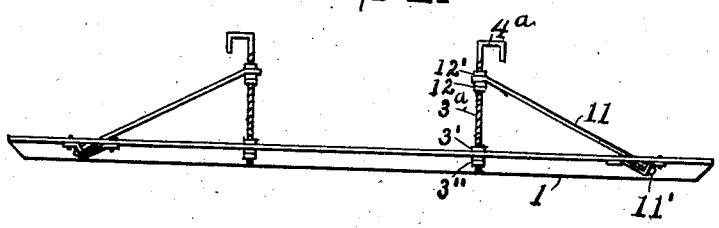

Fig. 2 is an enlarged end view of the support. Fig. 3 is an enlarged bottom view in perspective, of one of the supporting blocks. Figs. 4 and 5 are side elevations of the trussing devices, showing two of the other various forms in which the truss adjusting means may be constructed.

Referring to Fig. 1, my invention, in its preferred form, comprises the bar 1, preferably made of angle steel. Said bar is of such proportions that it is adapted to be suspended beneath the chassis of an automobile, transversely thereto, with its end portions beneath the hereinafter described running boards of said vehicle.

Referring to Fig. 3, blocks 2 have grooves 2' formed in their bottom surfaces, said grooves being of such proportions, that they fit the ends of bar 1, for preventing lateral movement of said blocks on said bar, while the hereinafter described running board flanges engage the upper portions of said blocks and hold them against longitudinal movement.

Since the rod supporting and bracing means of both ends of bar 1 are the same in construction and operation, but one of said rod supporting and bracing means is described.

The lower end of rod 3 is passed through an aperture in bar 1, (see Fig. 1,) and is adjustably secured therein, by nuts 3' and 3''.

Said rod has the horizontally extended portion 4, formed therewith, and the inclined rod portion 5 formed as an extension of said horizontal portion, forming one continuous rod. Said inclined portion extends downwardly and outwardly from said horizontal portion, with its lower end passed through an aperture in bar 1. Said lower end is adjustably secured in place by nuts 5'. Said rod portion 4 is adapted to rest upon the top surface of rail 6, of the chassis of an automobile, while the adjacent parts of rod portions 3 and 5 engage the edges of said rail and prevent lateral movement of said rod portions.

Running board 7 has downwardly projecting flanges 7' formed on the longitudinal edges thereof, between which the upper portion of block 2 is held against longitudinal movement on bar 1.

Said running board is supported by brackets 8, of which but one is shown. The upper ends of said brackets are secured in rail 6, while the lower ends, (not shown), are secured in the usual manner to running board 7. The lower ends of oppositely situated brackets are tied together by tie rod 8'.

In installation, said continuous rod, formed of portions 3, 4 and 5, is removed from bar 1, and placed in the position shown, and secured in place in bar 1 by nuts 5', screwed onto the lower end of rod portion 5, with block 2 in the position shown.

Bar 1 is further secured by screwing nuts 3' onto the lower end of rod portion 3, after which nuts 5' are again screwed upward, thereby raising the end of bar 1, and the thereon carried block 2, until said block is pressed against running board 7, with the desired pressure. Nuts 3' and 3'' are then tightened for holding bar 1 in alinement.

It will be understood that the upward strain on block 2 which is thus produced, is transferred to brackets 8, tightly holding all of the involved parts, and that the rod portion 5 is under tensile strain, while the intermediate portion of bar 1 is under a thrusting pressure. It will be further understood that the above described tension and strain of the described parts, holds all of said parts against vibration and consequent rattling, and that running board 7 is substantially held against sagging.

While I have shown and described nuts 5' as the adjusting means for adjusting the tension of rod portion 5, it is evident that variously formed adjusting means for said rod portion could be used, and that said rod could be correspondingly modified, without departing from the spirit of my invention, which I reserve the right to do.

One of such other various forms of adjusting means and rod portions is shown in Fig. 4, in which rod portion 5$^a$ is formed of two pieces and has head 5$^b$ formed on its lower end. The parts of said rod portion are adjustably connected by turnbuckle 10.

Since all of the other parts are the same in construction and operation, as the previously described parts, seen in Fig. 1; said other parts are similarly designated and further description of them is deemed unnecessary.

In the other form of rod adjusting means and rod portions, shown in Fig. 5, the vertical rod portion 3$^a$ is screw threaded from its lower end throughout the greater portion of its length. Hook 4$^a$ is formed on the upper end of said rod portion; said hook being adapted to rest upon and engage a longitudinal chassis rail, (not shown,) of an automobile.

Inclined rod 11 has head 11' formed on its lower end below bar 1, and an eye formed through its upper end, through which the screw threaded portion of rod 3$^a$ is passed. The tension of rod 11 is adjusted as desired, by screwing nut 12 on rod 3$^a$ for tightening and loosening said tension. Said adjustment is permitted by screwing nut 12' upward on rod 3$^a$, and is tightly secured by screwing the last mentioned nut downward, upon rod 11. Since all of the undescribed parts of this form are the same in construction and operation as the previously described parts seen in Fig. 1, said undescribed parts are similarly designated, and further description is deemed unnecessary.

Having fully described my invention, what I claim as new, and desire to secure by Letters Patent is:—

In a support of the class described, a bar extending transversely beneath the chassis of an automobile the end portions of said bar being extended beneath the running boards of said automobile; a block on each one of said end portions of said bar, said blocks being adapted to be held by said running boards against longitudinal movement on said bar, the bottom surfaces of said blocks having grooves formed therein for engaging said bar and holding said blocks against transverse movement thereon; suspending means whereby said bar is suspended from said chassis; adjusting means on said suspending means whereby said bar is adjusted for maintaining the same in alinement; inclined braces having their ends connected with said suspending means and bar respectively; and brace adjusting means whereby the tensions of said braces are adjusted for tightly pressing said blocks against said running boards.

In testimony whereof I affix my signature in the presence of two witnesses.

WILTON SUMNER SCHUYLER.

Witnesses:
 JOHN J. HINTON,
 J. H. GARVEY.